(12) United States Patent
George et al.

(10) Patent No.: US 10,002,358 B1
(45) Date of Patent: Jun. 19, 2018

(54) AUTOMATED MERCHANT AUTHORITY

(75) Inventors: Michael M. George, Mercer Island, WA (US); Gustavo E. Lopez, Seattle, WA (US); Bharathi Masilamani, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1841 days.

(21) Appl. No.: 13/246,709

(22) Filed: Sep. 27, 2011

(51) Int. Cl.
| | | |
|---|---|---|
| G06Q 99/00 | (2006.01) | |
| G06Q 30/00 | (2012.01) | |
| G06F 21/30 | (2013.01) | |
| G06F 21/31 | (2013.01) | |
| G06Q 30/02 | (2012.01) | |
| G06Q 30/06 | (2012.01) | |

(52) U.S. Cl.
CPC .......... *G06Q 30/018* (2013.01); *G06F 21/30* (2013.01); *G06F 21/31* (2013.01); *G06Q 30/02* (2013.01); *G06Q 30/0609* (2013.01)

(58) Field of Classification Search
None
See application file for complete search history.

(56) References Cited

U.S. PATENT DOCUMENTS

| | | | | |
|---|---|---|---|---|
| 6,269,343 B1 * | 7/2001 | Pallakoff | ................ | G06Q 30/02 705/26.2 |
| 6,405,174 B1 * | 6/2002 | Walker | ............. | G06Q 10/0631 705/14.21 |
| 7,366,682 B1 * | 4/2008 | Katiyar et al. | ............. | 705/14.51 |
| 7,668,747 B2 * | 2/2010 | Murphy | ................. | G06Q 30/02 705/14.26 |
| 7,672,897 B2 * | 3/2010 | Chung | ................... | G06Q 30/08 705/35 |
| 8,620,738 B2 * | 12/2013 | Fordyce, III | ........... | G06Q 30/02 705/14.3 |
| 2007/0208625 A1 * | 9/2007 | Walker et al. | ................... | 705/17 |
| 2009/0089074 A1 * | 4/2009 | Schoenberg | ........... | G06Q 30/02 705/2 |
| 2010/0262495 A1 * | 10/2010 | Dumon et al. | ............. | 705/14.54 |
| 2014/0181906 A1 * | 6/2014 | Barber | .................... | H04L 63/08 726/3 |
| 2015/0154607 A1 * | 6/2015 | Frome | ................. | G06Q 30/018 705/317 |

* cited by examiner

*Primary Examiner* — Jamie Kucab
(74) *Attorney, Agent, or Firm* — Lee & Hayes, PLLC

(57) ABSTRACT

Architectures and techniques are described related to identifying merchants associated with information obtained from a number of sources and storing portions of the information in data elements related to the merchants. The information may be provided in a structured format that enables the service provider to associate certain information with a particular merchant or in an unstructured format. The service provider may analyze the information received from the sources to determine whether the information includes any merchant identifying information. When the service provider identifies a merchant based on the merchant identifying information, the service provider may extract additional portions of the information received (e.g. merchant reviews, merchant attributes, etc.) and store those additional portions of information in the data element of the merchant. The service provider may utilize the information obtained about merchants for one or more applications, such as directory services, identifying affinities between merchants, and the like.

25 Claims, 8 Drawing Sheets

AUTOMATED MERCHANT AUTHORITY

BACKGROUND

Some service providers aggregate content about merchants and provide the content for public consumption. For example, merchant directory service providers may obtain content about merchants and provide the content via a site of the service provider and/or via a publication that is available to individuals. The content may include location information of the merchants, such as a physical address, contact information for the merchants (e.g. email address, phone number, etc.), descriptions of items offered by the merchants, reviews of the merchants, and so forth.

To avoid providing duplicate information for certain merchants, the service providers may limit the sources of information about merchants. In some cases, the service providers may merely provide content about merchants that is provided directly by the merchants. In other instances, the service providers may provide structured forms for providing information about merchants, such as providing reviews for merchants via particular pages of a service provider site. Additionally, some service providers may accept information about merchants from a number of sources, but the information is often filtered and consolidated manually. In certain situations, the manual filtering and consolidation of information about merchants from multiple sources is time-consuming and inefficient.

Thus, the availability of information about merchants is often limited due to service providers obtaining merchant information from a limited number of sources, due to the inefficient techniques used to consolidate information about merchants from multiple sources, or both. Limited availability of information about merchants can lead to dissatisfaction and frustration among consumers that often search multiple information sources to find the information they are looking for with respect to any particular merchant. Additionally, merchants are unable to utilize a single service provider to make their information available to the largest number of consumers possible.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
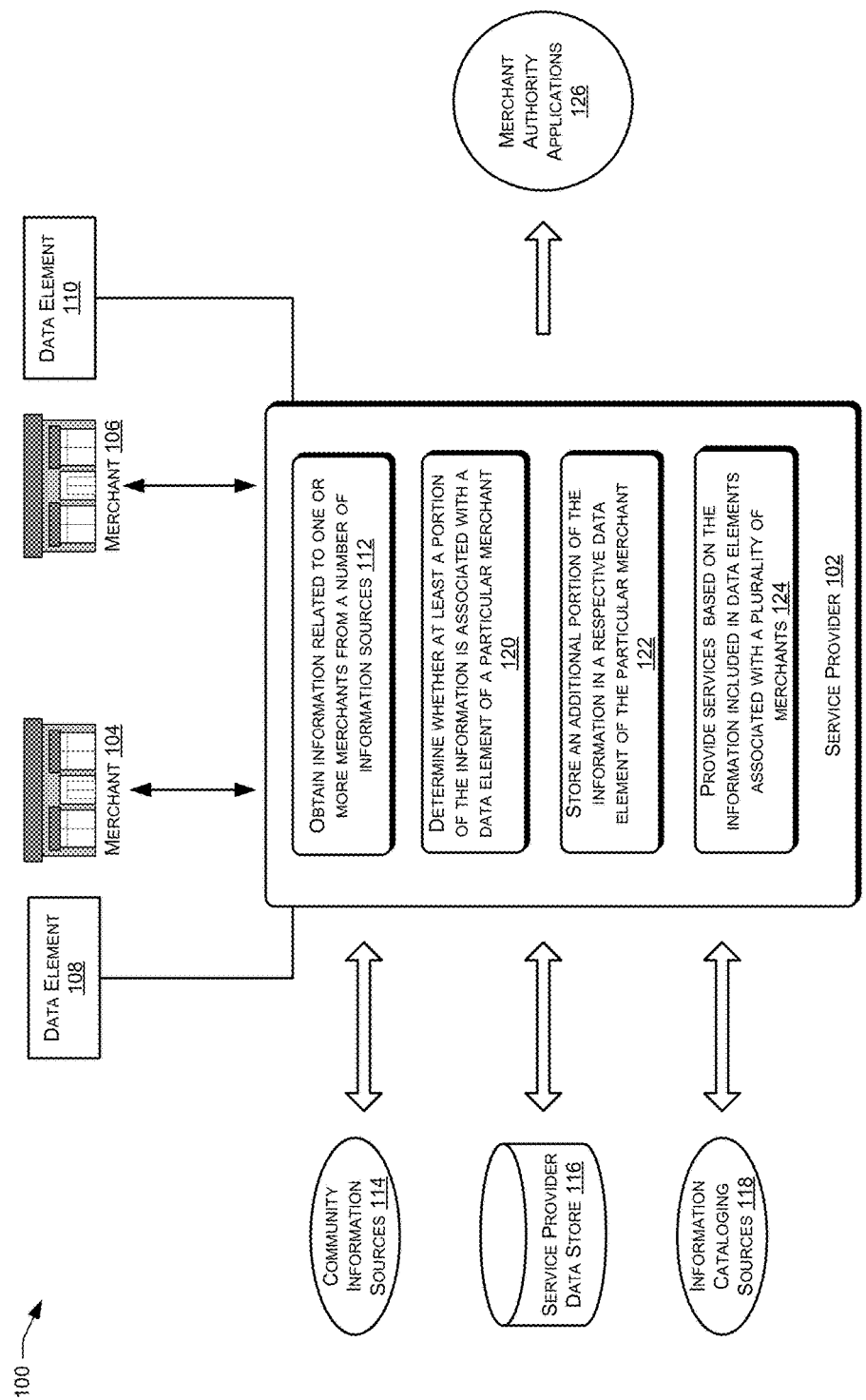
FIG. 1 illustrates an architecture to obtain information from a number of sources, determine merchants associated with the information, and store portions of the information in data elements of respective merchants.

This disclosure describes architectures and techniques related to identifying merchants associated with information obtained from a number of sources and storing portions of the information in respective data elements related to the merchants. In particular, a service provider may obtain information from a number of sources. In some cases, the service provider may obtain information from one or more sites, such as via scraping certain sites for information about merchants. In other instances, the service provider may receive information about merchants from one or more individuals, such as reviews of merchants, comments about merchants, etc. In addition, the service provider may obtain information about merchants from additional service providers that aggregate information about merchants (e.g. merchant information cataloging service providers, merchant directory service providers, etc.). Further, merchants may provide information to the service provider and deal sourcers that aggregate deals from a number of merchants may also provide information to the service provider. The service provider may store information about merchants in data elements associated with the merchants.

In some cases, the information may be provided in a structured format that enables the service provider to associate certain information with a particular merchant. The structured format may be a form that is provided via a page of a site of the service provider or a site of the merchant that includes user interface elements associated with certain fields that can capture information used to identify a particular merchant and that can capture information related to the particular merchant (e.g. hours of operation, items offered for acquisition, etc). In some situations, the structured format may be provided via one or more application programming interfaces (APIs), one or more webservices, or both. In other scenarios, the information may be provided to the service provider in an unstructured format, such as a posting or comment provided via a page of a site, via a mobile device app, via a communication (e.g. email, message, phone call, etc.), and so forth.

Further, different sources may provide information in different formats. For example, the service provider may receive information from some individuals about merchants via pages of a site dedicated to the merchants and/or via personal pages of sites, such as pages of social networking sites. In another example, the service provider may receive information about merchants from cataloging services that aggregate merchant information. In these examples, the individuals and the cataloging service may provide information about merchants that is not structured in a manner consistent with data elements of the service provider that store information related to merchants. Thus, the service provider may need to analyze the information received from the sources in order to determine whether the information includes any merchant identifying information. The merchant identifying information may include a name of a merchant, a tax identification number of a merchant, a physical location of a merchant, contact information for a merchant (e.g. email address, phone number, etc.), a unique identifier associated with a merchant, combinations thereof, and so forth. When the service provider identifies a merchant based on the merchant identifying information, the service provider may also extract additional portions of the information (e.g. reviews of the merchant, items offered by the merchant, deals offered by the merchant, etc.) and associate those additional portions of the information with the merchant. In particular situations, the service provider may identify the additional portions of the information based on certain content of the information, such as certain words included in the additional information, a context of words included in the information, and the like.

In addition, the service provider may utilize the information obtained about a particular merchant for one or more applications. For example, the service provider may provide merchant directory services that provide information about merchants to individuals. In another example, the service provider may utilize merchant information stored in the merchant data elements to provide deals to individuals based on item acquisition history from merchants, merchant locations visited, contacts of individuals that also visited the merchants, and so forth. Further, the service provider may offer merchants the opportunity to publish the stored information via a site of the merchant and/or provide information about merchants for acquisition by other service providers.

In this way, the service provider may automate the filtering and sorting of merchant information received from a number of sources. Thus, the efficiency of filtering information received from multiple sources is increased. Further, the amount of information available to consumers that is provided to the service provider may also increase. Thus, consumers can access information about merchants from a single information provider, rather than having to turn to multiple information providers for information about merchants.

Example Architectures

FIG. 1 illustrates an architecture 100 to obtain information from a number of sources, determine merchants associated with the information, and store portions of the information in data elements of respective merchants. The architecture 100 may include a service provider 102 that obtains merchant information from a number of sources and stores the information in association with a data element that corresponds to a particular merchant. The architecture 100 also includes a first merchant 104 and a second merchant 106. The merchants 104, 106 may be associated with one or more computing devices (not shown) that may be operated by one or more representatives of the merchants 104, 106. The computing device(s) may include a desktop computer, a smart phone, a laptop computer, a tablet computer, a server computer, another computing device, or combinations thereof.

In some cases, the service provider 102 may provide one or more services to the first merchant 104 and/or the second merchant 106. For example, the service provider 102 may offer items of the merchants 104, 106 for acquisition via a site of the service provider 102; the service provider 102 may offer deals on behalf of the merchants 104, 106; the service provider 102 may maintain respective sites of the merchants 104, 106; the service provider 102 may provide payment and/or fulfillment services for the merchants 104, 106; combinations thereof; and so forth. The items offered for acquisition by the merchants 104, 106 may include tangible items, intangible items, products, goods, services, a bundle of items, digital goods, digital services, and the like.

The items may be acquired by individuals via one or more physical locations, via one or more sites (e.g. a site of a merchant, an online retailer site, etc.), or combinations thereof. In some cases, the merchants 104, 106 may provide items acquired by individuals to locations specified by the individuals, such as via mobile services, delivery, etc. The acquisition of items by individuals may be achieved through various means of providing value for the items, such as purchasing items, renting items, borrowing items, trading items, bartering items, etc.

Each of the merchants 104, 106 may be associated with a respective data element 108, 110. In some cases, the data elements 108, 110 may have a particular data structure and include one or more portions of a database table, a tree data element, a list, an array, a record, combinations thereof, and the like. The data elements 108, 110 may store information about the merchants 104, 106. For example, the data element 108 may store characteristics of the merchant 104, such as name of the merchant, location information of the merchant 104, contact information of the merchant 104, reviews of the merchant 104, items offered by the merchant 104, deals offered by the merchant 104, combinations thereof, and so on. In certain implementations, the data elements 108, 110 may be associated with a respective unique identifier of the merchants 104, 106 that is provided by the service provider 102.

In the illustrative example of FIG. 1, at 112, the service provider 102 may obtain information related to one or more merchants from a number of information sources, such as community information sources 114, a service provider data store 116, information cataloging sources 118, or combinations thereof. The community information sources 114 may relate to individuals that provide information about merchants to the service provider 102. In certain situations, the individuals may provide information about merchants via one or more sites and/or via one or more forms of communication. In some implementations, the information may be submitted in a structured format where the information submitted by the individuals is directly linked to a particular merchant. In other implementations, the information may be submitted via a more unstructured format, such as via a comment or posting on a site or via an email or text message. To illustrate, the service provider 102 may obtain a posting from a social networking site that a particular merchant has changed their hours of operation or that the particular merchant has closed early on a particular day.

The service provider data store 116 may include information about merchants that has been previously obtained regarding the merchants. To illustrate, the service provider 102 may have received information from the merchant 104 as part of acquiring certain services from the service provider 102 (e.g. deals services, site hosting services, payment services, etc.). Accordingly, the service provider 102 may store this information in the service provider data store 116. The service provider 102 may also receive information from the merchants 104, 106 in response to requests for information from the service provider 102 and/or via updates to previously submitted information. The information cataloging sources 118 may provide information collected from a number of merchants, such as names of merchants, contact information for merchants, location information for the merchants, items offered by the merchants, combinations thereof, and the like. The information cataloging sources 118 may offer the information collected about merchants to other service providers, such as the service provider 102, for a specified price.

At 120, the service provider 102 may determine whether at least a portion of the information is associated with a merchant data element. For example, the service provider 102 may analyze information obtained from information sources to determine whether the information includes the unique identifier of the merchant 104 that is associated with the data element 108. In some situations, the unique identifier may be provided by a source providing merchant information. To illustrate, the service provider 102 may provide one or more user interfaces, such as via one or more APIs or one or more webservices, that include a respective element for capturing the unique merchant identifier provided by the service provider 102 with respect to the merchant 104. The user interfaces may also include other elements for capturing additional information about the merchant (e.g. reviews of the merchant, characteristics of the merchant, etc.). In another illustrative example, the service provider 102 may provide pages to information sources that are associated with the unique identifier of the merchant 104. Thus, when an information sources enters information via the pages, the information may be associated with the unique merchant identifier, such as via tagging or associating some form of metadata with the information that indicates the unique merchant identifier.

The service provider 102 may also determine whether information received from sources is associated with a merchant data element by comparing portions of the information received from the sources with data stored in the merchant data elements. In particular, the service provider 102 may specify that certain portions of the merchant data elements are merchant identifying information, such as a merchant name, merchant location information, merchant login, merchant password, merchant contact information, merchant URL, combinations thereof, and the like. In one illustrative example, the service provider 102 may receive information from a source including a name of a merchant and location information of the merchant. The service provider 102 may compare the name of the merchant and location information of the merchant with information stored in data elements associated with merchants, such as the data elements 108, 110. When the service provider 102 finds one or more matches between portions of the information received from the sources and the merchant identifying information stored in the merchant data elements, the service provider 102 may associate the information received from the sources with the respective merchants. In some situations, the service provider 102 may specify a threshold number of matches between information received from a source and portions of merchant identifying information before associating the information received from the sources with a particular merchant. For example, the service provider 102 may specify that particular information sources provide at least two pieces of merchant identifying information, such as name and location information, before associating the information provided by the sources with a particular merchant.

Additionally, at 122, the service provider 102 may store certain portions of the information received from an information source in a respective data element of a particular merchant. For example, after determining that information received from a source is associated with the merchant 104, the service provider 102 may store certain portions of the information in the data element 108. To illustrate, the service provider 102 may receive physical address information of the merchant 104, contact information of the merchant 104, image content of one or more locations of the merchant 104, and the like, from the cataloging information sources 118 and the service provider 102 may store at least a portion of this information in the data element 108. In another illustration, the service provider 102 may receive a number of reviews of the merchant 104 from the community information sources 114 and store the reviews in the data element 108.

In certain situations, the service provider 102 may determine if any portions of the information received from the sources include duplicate information. In these cases, the service provider 102 may refrain from storing the duplicate information in data elements of merchants. Additionally, the service provider 102 may determine whether information received from the information sources includes portions that conflict with information stored in data elements of merchants. When information received from one or more sources with respect to a particular merchant conflicts with information in the data elements of the merchants, the service provider 102 may perform a conflict resolution process to determine whether or not to replace the information stored in the data elements with the information received from the sources. In some implementations, the service provider 102 may determine a priority associated with the source providing the new information and a priority of the source that provided the information stored in a data element. The service provider 102 may determine that the information associated with the source having the higher priority is stored in the data element. In a particular example, the service provider 102 may store hours of operation information for the merchant 106 in the data element 110, where the hours of operation information is provided by a community information source 114, such as an individual that visited a location of the merchant 106. The service provider 102 may subsequently receive hours of operation information from the merchant 106. In this example, the merchant 106 may have a higher priority than the community information source 114 and the service provider 102 may replace the hours of operation information stored in the data element 110 with the hours of operation information provided by the merchant 106.

The priorities assigned to the respective information sources may be assigned by the service provider 102 and may be based on reputations of the sources, ratings of the sources, business relationships between the service provider 102 and the sources, combinations thereof, and the like. For example, the service provider 102 may assign a particular priority to the merchants 104, 106 based on the business relationships between the merchants 104, 106 and the service provider 102 related to the merchants 104, 106 obtaining certain services from the service provider 102. The service provider 102 may also utilize priorities assigned to information sources to determine whether or not to add information to a data element. In a particular implementation, the service provider 102 may specify that in order to add information from information sources having a certain priority, a threshold number of instances of the information must be obtained. To illustrate, the service provider 102 may specify that to add contact information of the merchant 104 to the data element 108, the service provider 102 may need to receive the same contact information from at least five community information sources 114. In another illustration, the service provider 102 may also specify that the service provider 102 may add contact information received from the merchant 104 and/or an information cataloging source 118 upon the receipt of one instance of the contact information due to the service provider 102 assigning a higher priority to the merchant 104 and the information cataloging source 118 than the priority assigned to the community information sources 114.

At 124, the service provider 102 may provide one or more merchant authority services 126 based on information included in data elements of merchants stored by the service provider 102. In one example, the service provider 102 may provide a directory site that includes information about the merchants 104, 106. The directory site may include information from the data elements 108, 110, such as contact information of the merchants 104, 106; physical location information of the merchants 104, 106; items offered for acquisition by the merchants 104, 106; reviews associated with the merchants 104, 106, combinations thereof, and so forth. The service provider 102 may also utilize the information stored in the data elements 108, 110 to determine affinities between the merchants 104, 106 based on location information of the merchants 104, 106, stored in the data elements 108, 110; information indicating characteristics of individuals that acquired items from the merchants 104, 106 stored in the data elements 108, 110; and so forth.

Figure 2:
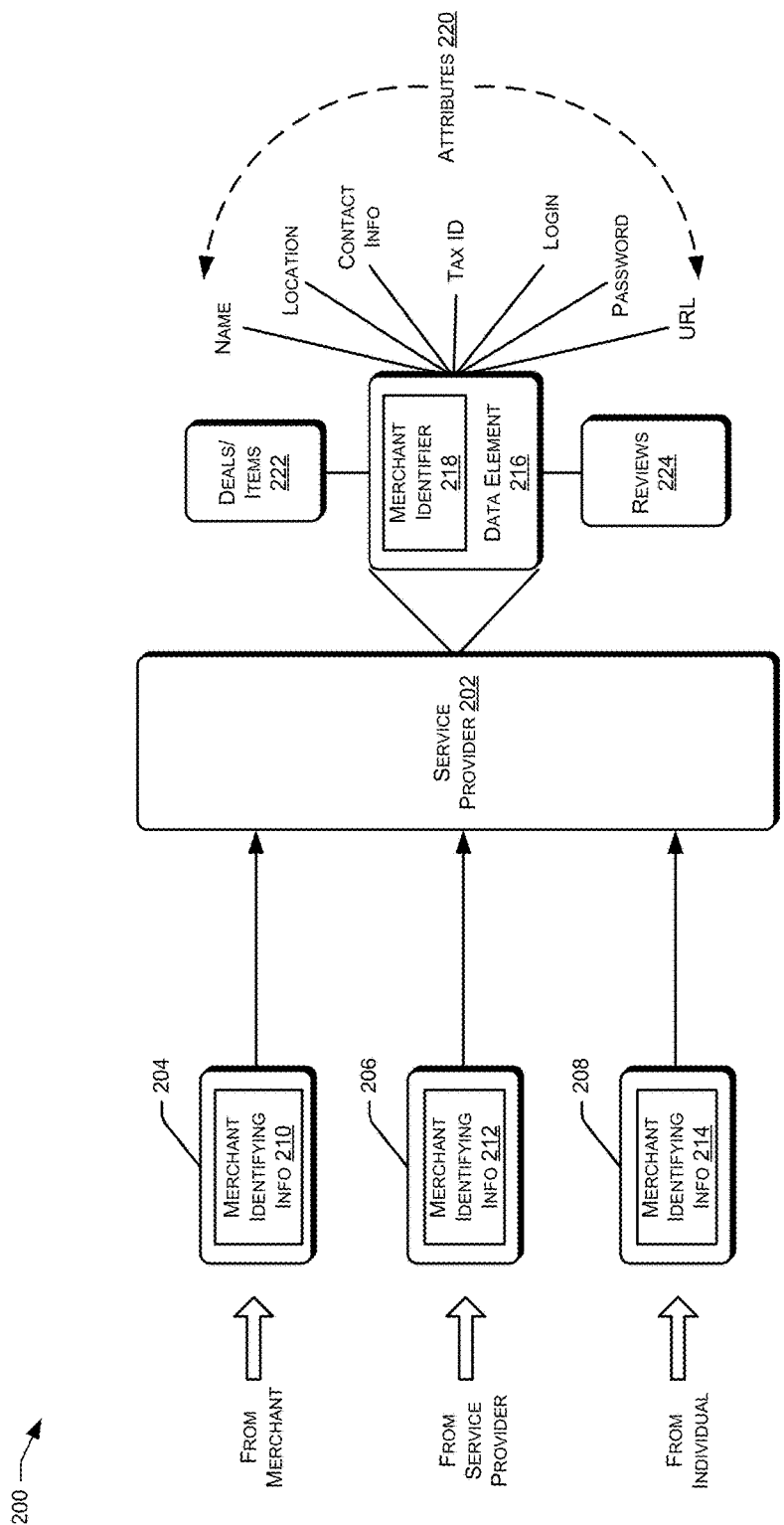
FIG. 2 illustrates an architecture to store information in association with a data element of a particular merchant.

FIG. 2 illustrates an architecture 200 to store information in association with a data element of a particular merchant. The architecture 200 includes a service provider 202 that may store information about a number of merchants and apply the merchant information in a number of ways. The service provider 202 may receive information from a number of sources. In particular, as illustrated in FIG. 1, the service provider 202 may receive information from a merchant, an additional service provider (e.g. an additional directory services site), and/or from an individual (i.e. a community information source).

In the illustrative implementation of FIG. 2, the service provider 202 may receive a number of portions of information 204, 206, 208. The number of portions of information 204, 206, 208 may include one or more packets, other groupings of bits, data parcels, and the like, that are transmitted to the service provider 102 via a local network, a remote network, a wireless network, a wireline network, or combinations thereof. The service provider 202 receives the information portion 204 from a merchant. The service provider 202 may offer items for acquisition on behalf of the merchant, such as via a site of the service provider 202. In addition, the service provider 202 may provide one or more services to the merchant, such as payment services, site hosting services, deals services, combinations thereof, and so forth.

The service provider 202 may receive the information portion 206 internally. That is, the information portion 206 may be provided from one component of the service provider 202 to another component. For example, the information portion 206 may be stored in a data store of the service provider 202 and accessed via certain modules of the service provider 202 to perform specified operations. The information portion 206 may also be exchanged between modules of the service provider 202 that perform respective operations. Further, the service provider 202 receives the information portion 208 from an individual. To illustrate, the service provider 202 may provide pages of a site and/or a mobile device app that capture information from individuals, such as reviews of merchants, characteristics of merchants, etc., and that provide the information to the service provider 202.

The portions of information 204, 206, 208 each include respective merchant identifying information 210, 212, 214. The merchant identifying information 210, 212, 214 may include one or more pieces of information that can be used by the service provider 202 to identify a merchant that is associated with the information portions 204, 206, 208. The merchant identifying information utilized by the service provider 202 to identify a merchant associated with the respective information portions 204, 206, 208 may be specified by the service provider 202. Additionally, the number of pieces of information and/or the type of information utilized by the service provider 202 to identify merchants may depend on the source of the information, the type of information provided, or both. For example, the service provider 202 may specify that the merchant providing the information portion 206 may be identified using a login and password of the merchant. In another example, the service provider 202 may specify that a merchant associated with the information portion 208 may be identified using a name of the merchant and a physical location of the merchant.

After receiving the information portions 204, 206, 208, the service provider 202 may identify a merchant based on the merchant identifying information 210, 212, 214 and determine whether the service provider 202 stores a data element associated with the respective merchants identified based on the merchant identifying information 210, 212, 214. In some cases, when the service provider 202 does not store a data element for a particular merchant associated with at least one of the information portions 204, 206, 208, the service provider 202 may generate a data element for the merchant to store information received from a number of sources. In an illustrative implementation, the service provider 202 may determine that the merchant providing the information portion 204 is associated with data element 216 stored by the service provider 202. In some cases, the service provider 202 may assign a unique identifier, such as merchant identifier 218, to the merchant. In certain situations, the merchant identifier 218 may be at least part of the merchant identifying information for the merchant.

The data element 216 may also store one or more categories of information associated with the merchant. In particular, the data element 216 stores one or more attributes 220 of the merchant. The attributes may include a name of the merchant, location information for the merchant, contact information for the merchant, a tax identification number of the merchant, a login identifier of the merchant, a password of the merchant, a uniform resource location (URL) of the merchant, and so forth. In some cases, one or more of the attributes 220 may be specified as merchant identifying information for the merchant. The data element 216 may also store information about the merchant, such as deals and/or items 222 offered by the merchant. In certain situations, the deals and/or items 222 may be deals and/or items offered by the service provider 202 on behalf of the merchant. Additionally, the data element 216 may also store reviews 224 related to the merchant. Further, the data element 216 may store additional information about the merchant, such as hours of operation of the merchant, information about employees of the merchant, a history of the merchant, image content related to the merchant, audio content related to the merchant, video content related to the merchant, combinations thereof, and so forth.

After identifying or generating a data element associated with each of the information portions 204, 206, 208, the service provider 202 may store at least part of the information portions 204, 206, 208 in the corresponding data elements. In certain situations, the service provider 202 may parse the content of the information portions 204, 206, 208 to identify information to store in the respective data elements. In addition, certain parts of the information portions 204, 206, 208 may be tagged as data to be stored in data elements associated with respective merchants. When the service provider 202 is unable to identify a merchant associated with a particular information portion, the service provider 202 may store the particular information portion and utilize subsequently received information portions to attempt to identify the merchant associated with the particular information portion at a later time.

Example System

Figure 3:
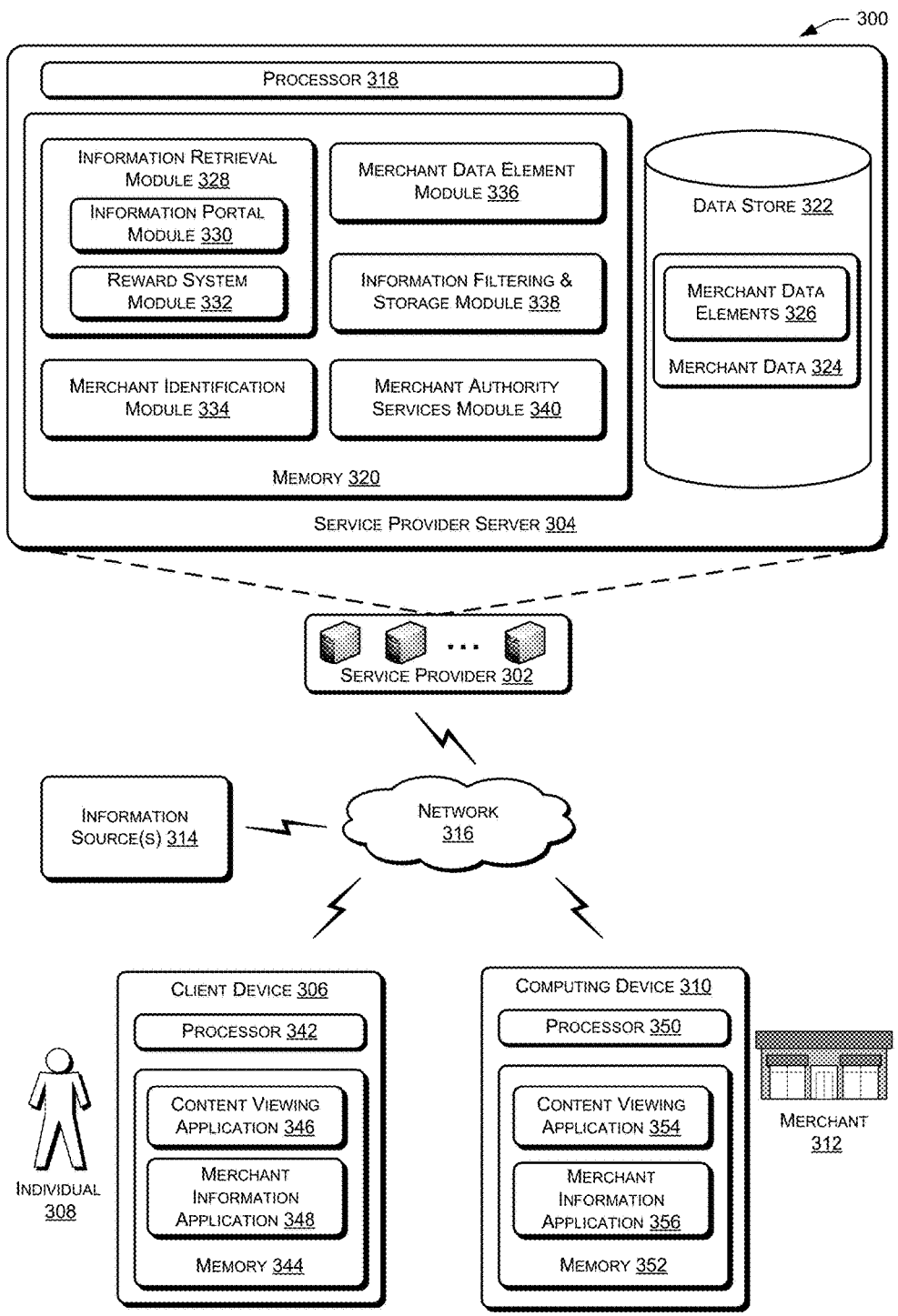
FIG. 3 illustrates a system to obtain information from a number of sources and reconcile the information with certain merchant data elements.

FIG. 3 illustrates a system 300 to obtain information from a number of sources and reconcile the information with certain merchant data elements. In particular, the system 300 includes a service provider 302 and a representative service provider server 304 that may comprise a single server, a cluster of servers, a server farm or data center, and so forth, although other server architectures (e.g., a mainframe architecture, a cloud computing architecture, etc.) may also be used. The system 300 also includes a client device 306 operated by an individual 308. In some situations, the individual 308 may acquire items and/or deals via the client device 306 for personal use, as gifts for others, for business purposes, or combinations thereof. The client device 306 may include a laptop computer, a desktop computer, a smart phone, an electronic reader device, a mobile handset, a personal digital assistant (PDA), a portable navigation device, a portable gaming device, a tablet computer, a portable media player, another client device, and the like.

Additionally, the system 300 may include a computing device 310 of a merchant 312 that offers items for acquisition by individuals. In some cases, the computing device 310 may be operated by a representative of the merchant 312. The computing device 310 may include a client device, a server computer, a point-of-sale device, or combinations thereof.

In addition, the system 300 includes one or more information sources represented by information source 314. The information source 314 may include one or more sites, such as social networking sites, micro-blogging sites, deals sites, directory sites, merchant sites, combinations thereof, and the like. Additionally, the information source 314 may include one or more merchants and one or more additional service providers, such as an information cataloging service provider that provides information gathered from a number of merchants, payment services providers, financial institutions, and so forth. The information source 314 may also include one or more individuals. In some cases, the one or more individuals may provide information via one or more pages of a site of the service provider 302, one or more mobile device apps, or both.

The service provider server 304, the client device 306, the computing device 310, the information source 314, or combinations thereof, may communicate via a network 316. The network 316 may include any one or combination of multiple different types of wired and wireless networks, such as the Internet, cable networks, satellite networks, wide area wireless communication networks, wired local area networks, wireless local area networks, and public switched telephone networks (PSTN).

The service provider server 304 includes one or more processors represented by processor 318. The service provider server 304 also includes memory 320 that is accessible by the processor 318. The memory 320 is an example of computer readable storage media and may include volatile memory, nonvolatile memory, removable memory, non-removable memory, or a combination thereof. For example, the memory 320 may include, but is not limited to, RAM, ROM, EEPROM, flash memory, one or more hard disks, solid state drives, optical memory (e.g. CD, DVD), or other non-transient memory technologies. The memory 320 may store a number of modules including computer-readable instructions executable by the processor 318 to obtain information from a number of information sources 314 and store portions of the information in association with particular merchants. In some cases, one or more of the operations of the modules may be performed in an automated manner without input from a user, while in other instances one or more operations of the modules may be performed in response to user input.

The service provider server 304 also includes, or is coupled to, a data store 322 that may include, but is not limited to, RAM, ROM, EEPROM, flash memory, one or more hard disks, solid state drives, optical memory (e.g. CD, DVD), or other non-transient memory technologies. The data store 322 stores merchant data 324 that includes information about merchants. In some cases, the merchants may obtain one or more services from the service provider 302, such as offering items for acquisition via the service provider 302, fulfillment services for items offered by the merchants, site hosting services, payment services, deals services, directory services, and the like. In other situations, the merchants associated with portions of the merchant data 324 may not obtain services of the service provider 302.

The merchant data 324 may include ratings of the merchants, reviews of the merchants, reputations of merchants, payment arrangements between merchants and the service provider 302, computing device information of merchants (e.g. operating systems executed, hardware components, software applications executed, etc.), services acquired by merchants from the service provider 302, preferences of the merchants, deal acquisition history of the merchants, item acquisition history of the merchants, items offered for acquisition by the merchants, deals offered by the merchants, combinations thereof, and the like. In some cases, the merchant data 324 may include data from accounts of merchants with the service provider 302, such as login identifiers of the merchants, passwords of the merchants, contact information of the merchants (e.g. email addresses, phone numbers, etc.), payment instrument information of the merchants, location information of the merchants (e.g. physical addresses), URLs of the merchants, combinations thereof, and so on.

In certain implementations, at least portions of the merchant data 324 may be stored with respect to merchant data elements 326. The data elements 326 may be associated with a particular data structure, such as a database table, an array, a linked-list, a hash-table, a graph, a tree, a stack, a queue, combinations thereof, and the like. In particular cases, at least a portion of the data elements 326 may have a common data structure. For example, merchants associated with a particular category of items and/or a specified location may be associated with a common data structure (e.g. database table, etc.) with the respective data elements 326 for those merchants having values corresponding to each particular merchant. In other instances, the data elements 326 for some merchants may have different data structures.

In some situations, the service provider 302 may dedicate one or more respective merchant data elements 326 to each merchant that is associated with data stored as the merchant data 324. The service provider 302 may associate a unique merchant identifier to the merchant data element(s) related to a particular merchant, such as the merchant 312. The merchant identifier may be a key, hash, etc., specified by the service provider 302 for a particular merchant.

The memory 320 may store an information retrieval module 328 that is executable by the processor 318 to obtain information about merchants from a number of information sources, such as the information source 314, and store the information in the data store 322. In some cases, the information retrieval module 328 may request the information from at least some information sources. In other situations, the information retrieval module 328 may receive information from information sources periodically, at irregular intervals, or both. Additionally, the information retrieval module 328 may obtain information about merchants by scraping a number of sites, such as merchant sites, deals sites, directory sites, etc.

The information retrieval module 328 may include an information portal module 330 that is executable by the processor 320 to provide one or more user interfaces to obtain information about merchants. The one or more user interfaces may be accessed via one or more pages of a site of the service provider 302, via a mobile device app executing on a client device, or both. Additionally, user interfaces may be accessed by individuals, merchants, representatives of the service provider 302, or combinations thereof, to provide information about merchants. In certain instances, the information portal module 330 may enable individuals to access personal pages provided by the service provider 302 that are associated with an account of the individuals with the service provider 302. The individuals may provide content to their personal pages, such as image content, video content, text content, audio content, combinations thereof, and so forth. The information portal module 330 may also enable individuals to enter comments or posts, which in some cases, may include information about merchants. Further, the information portal module 330 may enable representatives of merchants to log in to accounts of the merchants with the service provider 302 and provide information about the merchants to the service provider 302.

In an illustrative implementation, the information portal module 330 may provide a particular framework for providing information about merchants to the service provider 302. For example, the information portal module 330 may provide a number of user interfaces with particular user interface elements to capture information about merchants. To illustrate, the information portal module 330 may provide a user interface that has some user interface elements that accept information used to identify a particular merchant, such as a name of the particular merchant, a physical location of the particular merchant, a tax identification number of the particular merchant, a login identifier and password of the particular merchant, a unique merchant identifier assigned by the service provider 302, combinations thereof, and the like. In some scenarios, the merchant identifying information may be selected from predetermined lists of merchant identifying information provided by the service provider 302.

The user interfaces provided by the information portal module 330 may also include user interface elements for capturing additional information about merchants, such as reviews of merchants, ratings of merchants, attributes of merchants (e.g. hours of operation, items offered by the merchants, categories of items offered by the merchants, deals offered by the merchants, and so forth. The user interfaces provided by the information portal module 330 may also include user interface elements to capture and/or upload content related to merchants, such as text content, video content, image content, audio content, etc. In some cases, the user interface elements provided by the information portal module 330 for capturing merchant information may include text entry boxes, radio buttons, drop-down menus, icons, windows, widgets, and the like.

When merchant identifying information is provided for a particular merchant via the information portal module 330, additional information submitted with the merchant identifying information may be associated with the particular merchant. To illustrate, the information portal module 330 may tag or otherwise encode the additional information such that the additional information is associated with the merchant identifying information received via the information portal module 330, such as via one or more user interfaces. In another example, the information portal module 330 may dedicate certain pages to respective merchants. Accordingly, any information captured on a page dedicated to a particular merchant may be associated with that particular merchant by the information portal module 330.

In certain implementations, the information portal module 330 may provide user interfaces that capture information with less structure than in other implementations. In one example, the information portal module 330 may provide user interfaces that enable users to enter merchant information in a free form manner, such as entering text strings of a merchant name as opposed to choosing from a list of merchant names. In another example, the information portal module 330 may not specifically provide user interface elements dedicated to capturing merchant identifying information and may merely provide a text entry box to receive comments and/or postings from individuals.

Additionally, the information retrieval module 328 may include a rewards system module 332 that is executable by the processor 318 to provide rewards to individuals for providing merchant information to the service provider 302. In some cases, the rewards may be non-monetary and may include an improved reputation for the individuals, a public acknowledgement of the individuals by the service provider 302, access to certain features offered by the service provider 302 (e.g. preview of forthcoming deals), combinations thereof, and the like. The rewards may also include some form of value. The value may include one or more currencies, such as a monetary currency or a promotional currency that is offered by the service provider 302 to acquire items via the service provider 302. The value may also include points that may be accumulated to acquire items via the service provider 302, to acquire items from certain merchants, or both. In some cases, individuals may receive rewards based on certain categories of information provided. For example, the rewards system module 332 may provide a specified reward for receiving reviews of merchants and another reward for receiving attributes of merchants (e.g. physical location, contact information, hours of operation, etc). The rewards system module 332 may also provide rewards to individuals that provide information about specified merchants, to individuals that provide accurate information, to individuals with a particular reputation, or combinations thereof.

The memory 320 also stores a merchant identification module 334 that is executable by the processor 318 to identify particular merchants associated with certain information received by the service provider 302, such as merchant information received via the information retrieval module 328. In a particular example, the merchant identification module 334 may analyze portions of information received via the information retrieval module 328 and determine whether the portions of information include merchant identifying information. To illustrate, the merchant identification module 334 may determine whether one or more portions of information include a login of a merchant, a password of a merchant, a name of a merchant, a location of a merchant, a tax identification number of a merchant, a unique identifier of a merchant, combinations thereof, and so forth, by parsing a stream of data for tags or other metadata that indicate merchant identifying information. The merchant identification module 334 may determine a merchant associated with particular portions of information based on merchant identification information included in the particular portions of the information.

The service provider 302 may specify rules governing the identification of merchants according to the merchant identification information. In one example, the service provider 302 may specify that certain information is to be provided in order to identify a merchant, such as a merchant tax identification number, a merchant name, a merchant location, combinations thereof, and so forth. Additionally, the service provider 302 may specify the merchant identifying information that is to be provided to identify certain merchants based on a priority assigned to the information source providing information to the service provider 302, based on the merchant being identified, or both. The priority may be assigned to an information source based on a reputation of the information source, a business relationship between the information source and the service provider, reviews of the information source, reliability of information previously provided by the information sources, and so on. In a particular implementation, the service provider 302 may specify that the identity of a merchant associated with information provided by an information cataloging service may be determined based on certain merchant identifying information, while the identity of a merchant associated with information provided by a particular individual may be determined based on at least one different piece of merchant identifying information. In this implementation, the information cataloging service may have a business relationship with the service provider 302 to provide merchant information. Thus, the service provider 302 may assign a higher priority to the information cataloging service than a priority assigned to the individual. Accordingly, the service provider 302 may specify that the information cataloging service may need to provide less merchant identifying information or different merchant identifying information than the individual. In certain situations, when merchant information is provided in a freeform manner, such as via a comment or post provided via a particular site or mobile device app, the merchant identifying module 334 may parse the text received in an attempt to determine whether the merchant information includes merchant identifying information. The merchant identifying module 334 may look for particular keywords of the text in order to identify a merchant associated with the text. In some cases, the keywords may be included in an aggregation of merchant identifying information related to merchants that already have merchant identifying information stored in the merchant data elements 326.

The memory 320 may also include a merchant data element module 336 that is executable by the processor 318 to determine whether merchant information received from an information source is associated with a data element of a particular merchant. For example, the merchant data element module 336 may compare merchant identifying information associated with one or more portions of information received from a source with corresponding merchant identifying information stored in the merchant data elements 326. To illustrate, the merchant data element module 336 may search the merchant data elements 326 for a specified merchant name, a specified merchant tax identification number, and the like, to identify a particular merchant data element 326 associated with a portion of information received from an information source. When a merchant data element 326 associated with particular merchant identifying information is not stored in the data store 322, the merchant data element module 336 may create a new merchant data element 326. The newly created data element 326 may have a particular data structure. In situations, where a particular data element 326 does include merchant identifying information that matches merchant identifying information received from an information source, the merchant data element module 336 may invoke information filtering and storage module 338 to store certain data in the particular data element 326.

In some instances, the merchant data element module 336 may generate a merchant data element 326 for a merchant in response to a request from the service provider 302 and/or the merchant. In one situation, a merchant may provide information to the service provider 302 as part of obtaining services from the service provider 302, such as site hosting services, deal services, etc. In this situation, the service provider 302 may request that the merchant data element module 336 generates a merchant data element 326 that corresponds to the merchant and that the merchant data element 326 is populated with the information provided by the merchant. In some scenarios, the merchant data element module 336 may generate a unique merchant identifier for each merchant data element 326 created by the merchant data element module 336.

Additionally, the merchant data element module 336 may update the data element 326 of a particular merchant as additional information about the particular merchant is received. In particular implementations, the merchant data element module 336 may modify the structure of the data element 326 associated with the particular merchant to accommodate newly received information relating to the merchant. In some cases, the data structure of a data element 326 of the particular merchant may be modified upon receipt of a type of data that is not currently supported by the current data structure. For example, the service provider 302 may receive 3-dimensional content related to the particular merchant and the merchant data element module 336 may modify a structure of the data element 326 associated with the particular merchant to support the storage of the 3-dimensional video content if that type of data is not already supported by a current structure of the data element 326 of the particular merchant. The modification of the structure of the data element 326 of the particular merchant may include generating a new data element 326 having a different data structure, such as changing the data structure from a database table to a linked list.

In other situations, merchant data elements 326 may be generated for respective merchants when the service provider 302 receives merchant information from other sources, such as individuals, information cataloging sources, one or more sites, and so on. For example, the information retrieval module 328 may receive a review from an individual about a merchant that does not have a respective merchant data element 326 stored in the data store 322. Consequently, the merchant data element module 336 may generate a corresponding data element 326 for the merchant that includes the review. In some cases, the service provider 302 may initiate contact with merchants having merchant data elements 326 stored in the data store 322. For example, the service provider 302 may send a communication to the merchants indicating that the service provider 302 is storing data related to the merchant and that the merchant may choose to utilize the data in a particular manner, such as providing the data on a page of a site associated with the merchant. The service provider 302 may then provide the merchants with an option to claim the data stored in the merchant data elements 326 associated with the merchants and utilize the data is some manner specified by the service provider 302 and/or in a manner specified in a contractual obligation between the respective merchants and the service provider 302. In other cases, merchants having data elements 326 stored in the data store 322 that are not aware of these data elements 326 may contact the service provider 302 for a reason, such as to acquire certain services from the service provider 302. In these situations, the merchant data element 336 may provide the merchants with an opportunity to claim their respective merchant data element 326.

In certain cases, the merchant data element module 336 may utilize merchant identifying information to distinguish between merchant data elements 326 that are associated with different locations of the same merchant. In particular, the data store 322 may store respective merchant data elements 326 for each location of a merchant and the merchant data element module 326 may utilize merchant identifying information, such as a physical address, to determine the particular merchant data element 326 that is associated with a portion of merchant information received by the service provider 302. Further, the merchant data element module 336 may utilize merchant identifying information to differentiate between parent entities and subsidiary entities related to a particular merchant. In some instances, the data store 322 may store merchant data elements for parent entities related to a merchant and subsidiary entities related to the merchant. Upon receiving merchant information from a source that corresponds to particular merchant, the merchant data element module 336 may determine whether merchant identifying information accompanying the merchant information is associated with a parent entity of the particular merchant or a subsidiary entity of the particular merchant.

The memory 320 may store the information filtering and storage module 338 that is executable by the processor 318 to store certain information received from one or more information sources 314 in respective merchant data elements 326. For example, after the merchant data element module 336 identifies or generates a merchant data element 326 related to a merchant associated with one or more portions of information received by the service provider 302, the information filtering and storage module 338 may store particular portions of the information in the corresponding merchant data elements 326. To illustrate, when the information retrieval module 328 receives hours of operation information for a particular merchant, the information filtering and storage module 338 may store the hours of operation information in a merchant data element 326 associated with the particular merchant. In some instances, the merchant data element 326 may indicate that certain information is to be stored in a certain location of the merchant data element 326 (e.g. a certain row of a database table) and the information filtering and storage module 338 may store the respective information in the appropriate location of the data element 326 upon receipt of the respective information by the service provider 302.

In certain situations, the information filtering and storage module 338 may filter information received from the information sources 314 before storing the information in a particular merchant data element 326. To illustrate, the information filtering and storage module 338 may determine whether portions of information received by the service provider 302 include duplicate information with respect to information about a particular merchant stored in a corresponding merchant data element 326. In one example, the information retrieval module 328 may receive an email address of a particular merchant and the information filtering and storage module 338 may determine that the email address is already stored in a merchant data element 326 associated with the merchant. In this example, the information filtering and storage module 338 may refrain from storing the duplicate information in the particular merchant data element 326.

In other situations, the information filtering and storage module 338 may resolve conflicts between information received at the service provider 302 related to a particular merchant and information stored in a merchant data element 326 of the particular merchant. For example, the information retrieval module 330 may receive information indicating a URL of a merchant. When the URL of the merchant received from the information source is different from a URL for the merchant stored in the merchant data element 326, the information filtering and storage module 338 may engage in a conflict resolution process to determine whether or not to replace the URL stored in the merchant data element 326 with the URL received from the information source. In some implementations, the information filtering and storage module 338 may utilize priorities assigned to information sources to resolve the conflict. In an illustrative implementation, the information source that provided the URL stored in the merchant data element 326 may have a first priority, while the information source providing the conflicting URL to the service provider 302 may have a second priority. When the first priority is higher than the second priority, the URL stored in the merchant data element 326 remains, but when the second priority is higher than the first priority, the URL stored in the merchant data element 326 is replaced with the newly received URL. In a particular example, the service provider 302 may assign a higher priority to merchants providing information about themselves than individuals that provide information about the merchants. Thus, when the newly received URL is provided by the merchant and the URL stored in the merchant data element 326 is provided by an individual, the URL provided by the merchant will replace the current URL stored in the merchant data element 326.

In particular implementations, the information filtering and storage module 338 may receive input before storing certain information in a data element 326 of a merchant. In some situations, the input may be received from the merchant. For example, the service provider 302 may provide a communication, a page of a site, or both, that enables a representative of the merchant to indicate whether specified information is to be stored in the data element 326 of the merchant. In certain scenarios, the merchant may provide input to resolve conflicts between pieces of information received from various information sources. In other instances, input may be received from a representative of the service provider 302 indicating whether or not to store particular information in a respective data element 326 of a merchant.

In addition, the memory 320 includes a merchant authority services module 340 that is executable by the processor 318 to utilize information stored in the merchant data elements 326 to provide one or more services. In one example, the merchant authority services module 340 may utilize information about merchants stored in the merchant data elements 326 to provide directory services. The directory services may be directed to an online directory site, to a printed directory, or both, that include specified information about merchants, such as a location of the merchants, ratings of the merchants, contact information for the merchants, category of items offered for acquisition by the merchants, name of the merchants, combinations thereof, and the like.

In another example, the merchant authority services module 340 may provide access to merchants and/or additional service providers to merchant information stored in the merchant data elements 326. In particular, the merchant authority services module 340 may provide information to a merchant that the merchant can use to populate a site of the merchant. Additionally, the merchant authority services module 340 may provide merchant information to a directory services provider that may be used to populate a directory site and/or printed directory offered by the directory services provider.

The merchant authority services module 340 may also utilize information of the merchant data elements 326, information about individuals stored in the data store 322 (not shown), or both to determine affinities between merchants. To illustrate, the merchant authority services module 340 may determine that a threshold number of individuals that visited a first merchant also visited a second merchant based at least partly on location information stored with respect to the individuals. The merchant authority services module 340 may store this affinity with respect to the merchant data elements 326 of the first merchant and the second merchant. The merchant authority services module 340 may also provide content via pages of a site and/or via a mobile device app that indicates the affinity between first merchant and the second merchant. Additionally, based on item acquisition histories of individuals, the merchant authority services module 340 may determine an affinity between a first merchant and a second merchant when a threshold number of individuals acquire one or more particular items from both the first merchant and the second merchant.

Further, the merchant authority services module 340 may provide deal services for merchants. To illustrate, the merchant authority module 340 may utilize previous deal acquisition history, items offered by a particular merchant, and so forth, to recommend deals for the particular merchant to offer. The merchant authority services module 340 may also identify a target audience for deals offered by the particular merchant based on information stored in the merchant data element 326 of the particular merchant, based on information about individuals stored in the data store (e.g. individual deal preferences, individual item acquisition histories, individual deal acquisition histories, etc.), or both.

The client device 306 includes a processor 342 and memory 344. The memory 344 is an example of computer readable storage media and may include volatile memory, nonvolatile memory, removable memory, non-removable memory, or a combination thereof. For example, the memory 344 may include, but is not limited to, RAM, ROM, EEPROM, flash memory, one or more hard disks, solid state drives, optical memory (e.g. CD, DVD), or other non-transient memory technologies. In addition, the memory 344 may store a number of applications including computer-readable instructions executable by the processor 342 to provide merchant information to the service provider 302. The client device 306 may also include one or more input/output devices (not shown), such as a display, a touchpad, a touch screen, a pointer device, speakers, microphones, keyboard, image capture devices (e.g. camera, scanner), and the like.

The memory 344 includes one or more content viewing applications represented by content viewing application 346 that is executable by the processor 342 to view electronic content provided by a number of sources. In some cases, the content viewing application 346 may be a browser application that may be executable to view pages of sites provided by electronic content sources. In particular, the content viewing application 346 may be executable by the processor 342 to access sites that capture merchant information, such as a site of the service provider 302, a site of the merchant 312, and/or a site of a deal sourcer.

The memory 340 may also include one or more individual merchant information applications 348 that are executable by the processor 342 to provide merchant information to the service provider 302. The merchant information may includes reviews of merchants, comments including information about merchants, posts including information about merchants, attributes of merchants, combinations thereof, and the like.

The computing device 310 includes a processor 350 and memory 352. The memory 352 is an example of computer readable storage media and may include volatile memory, nonvolatile memory, removable memory, non-removable memory, or a combination thereof. For example, the memory 352 may include, but is not limited to, RAM, ROM, EEPROM, flash memory, one or more hard disks, solid state drives, optical memory (e.g. CD, DVD), or other non-transient memory technologies. In addition, the memory 352 may store a number of applications including computer-readable instructions executable by the processor 350 to provide information about the merchant 312 to the service provider 302. The computing device 310 may also include one or more input/output devices (not shown), such as a display, a touchpad, a touch screen, a pointer device, speakers, microphones, keyboard, image capture devices (e.g. camera, scanner), and the like. In some situations, the computing device 310 may be a server, a client device (e.g. desktop computer, smart phone, electronic reader device, tablet computer, laptop computer, etc.), a point-of-sale device, combinations thereof, and the like.

The memory 352 includes one or more content viewing applications represented by content viewing application 354 that is executable by the processor 350 to view electronic content provided by a number of sources. In some cases, the content viewing application 354 may be a browser application that may be executable to view pages of sites provided by electronic content sources. In particular, the content viewing application 354 may be executable by the processor 250 to access a site of the service provider 302 to provide information about the merchant 312. In a particular example, a representative of the merchant 312 may utilize the client device 310 to access a page of a site of the service provider 302 and log in to an account of the merchant 312 with the service provide 302 using a login identifier, password, additional unique identifier of the merchant 312, combinations thereof, and so on. After logging in to the account of the merchant 312 with the service provider 302, the computing device 310 may access pages of a site of the service provider 302 that enable the entry of information about the merchant 312, such as items offered by the merchant 312, deals offered by the merchant 312, location information of the merchant 312, contact information of the merchant 312, combinations thereof, and the like. The memory 352 may also include a merchant information application 356 that is executable by the processor 350 to provide information about the merchant 312 to the service provider 302.

Example User Interfaces

Figure 4:
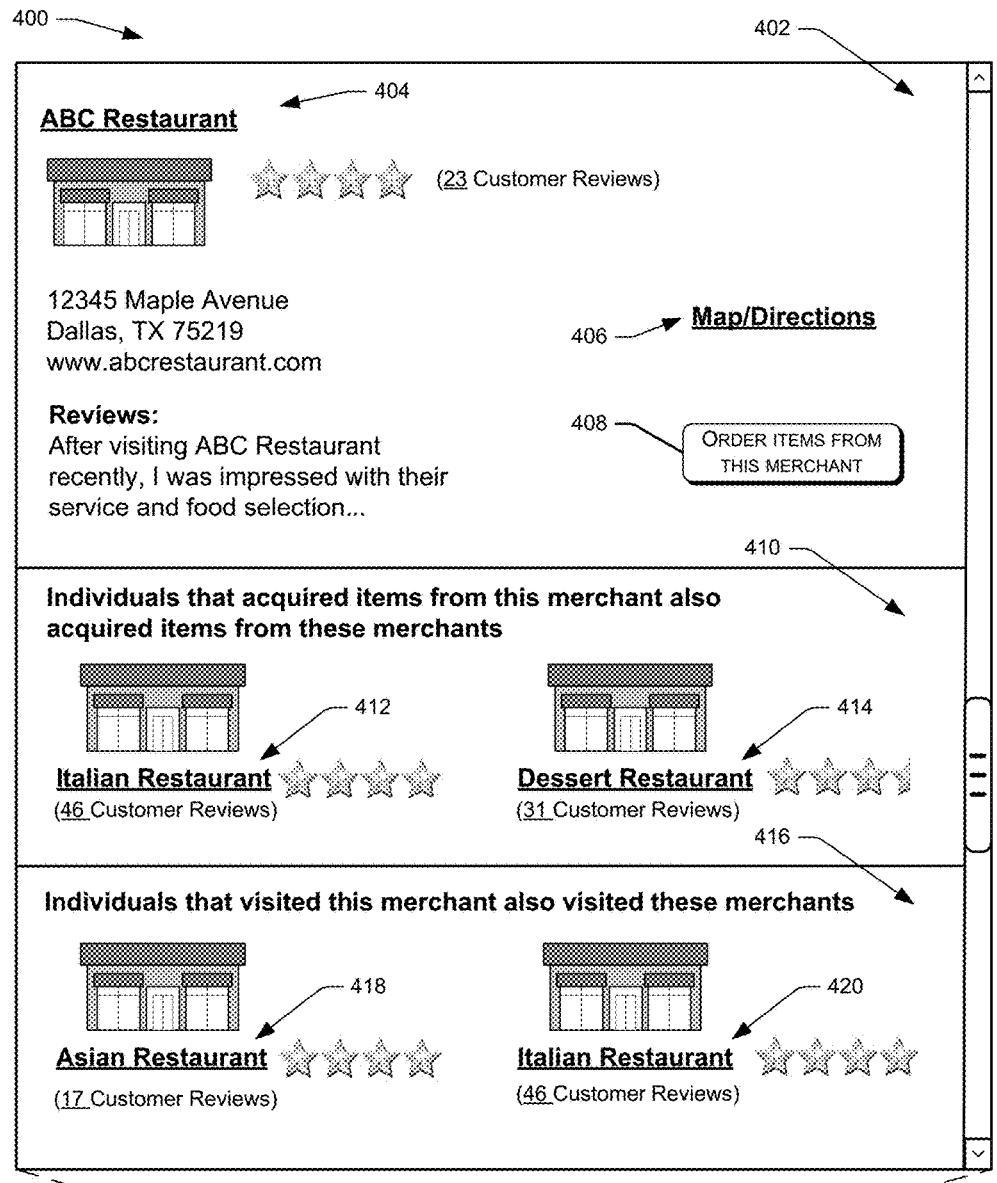
FIG. 4 shows a user interface including information about a particular merchant that has been obtained from a number of sources.

FIG. 4 shows a user interface 400 including information about a particular merchant that has been obtained from a number of sources. The user interface 400 may be provided via a display of a client device, such as the client device 306 operated by the individual 308. In some cases, the user interface 400 may comprise at least a portion of a page of a site provided by a service provider, such as a directory site. Additionally, the user interface 400 may be accessible via a client device application executing on the client device 306, such as a mobile device app.

The user interface 400 includes a portion 402 that includes information about a particular merchant ABC Restaurant. The information about ABC Restaurant may include contact information, a URL of ABC Restaurant, a rating of ABC Restaurant, one or more reviews of ABC Restaurant, image content of ABC Restaurant, and the like. In the illustrative example of FIG. 4, the portion 402 includes a link 404 that is selectable to access additional information about ABC Restaurant. In some cases, selection of the link 404 may direct the computing device 306 to a site of ABC Restaurant. Additionally, the portion 402 includes a link 406 that is selectable to access a map and/or directions to the location of ABC Restaurant. Further, the portion 402 includes an option 408 that is selectable to order items from ABC Restaurant. In certain implementations, selection of the option 408 may direct the computing device 306 to a site of ABC Restaurant or to a site of a service provider that enables the acquisition of items from ABC Restaurant.

The user interface 400 also includes portion 410 that indicates a particular affinity between ABC Restaurant and additional restaurants. In particular, the portion 410 specifies particular merchants that individuals acquiring items from ABC Restaurant have also acquired items from, such as Italian Restaurant and Dessert Restaurant. The merchants shown in portion 410 may be based on item acquisition histories of a number of individuals. The portion 410 may include information about the merchants, such as ratings of the merchants, image content of the merchants, and the like. Additionally, the portion 410 includes a link 412 that is selectable to access additional information about Italian Restaurant and a link 414 that is selectable to access additional information about Dessert Restaurant.

Further, the user interface 400 includes a portion 416 that indicates an additional affinity between ABC Restaurant and other merchants. For example, the portion 416 indicates that individuals visiting ABC Restaurant have also visited certain additional restaurants, such as Asian Restaurant and Italian Restaurant. The merchants shown in the portion 416 may be based on location information of a number of individuals. The portion 416 may include information about the merchants, such as ratings of the merchants, image content of the merchants, and so on. In particular, the portion 416 includes a link 418 that is selectable to access additional information about Asian Restaurant and a link 420 that is selectable to access additional information about Italian Restaurant.

Figure 5:
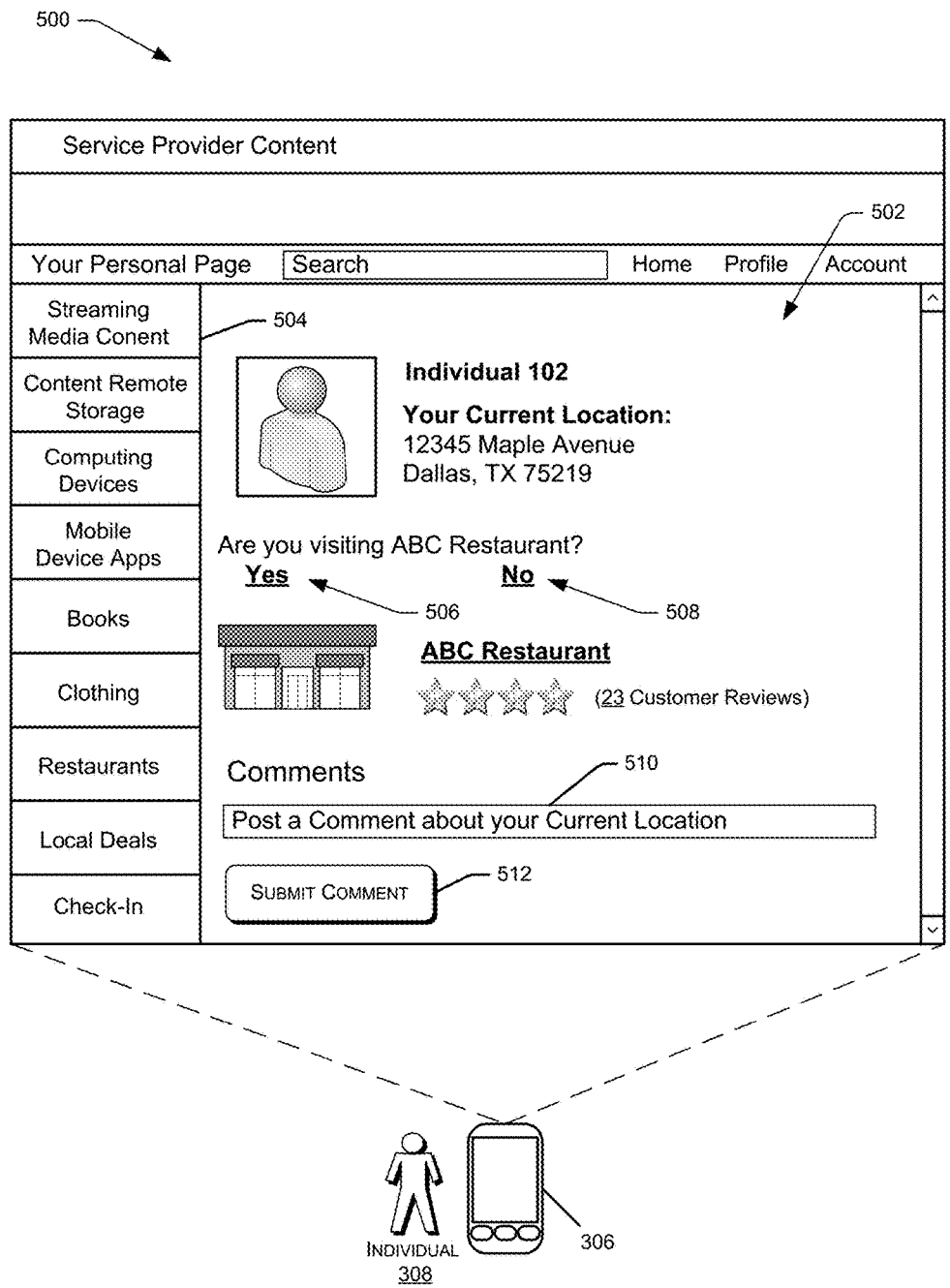
FIG. 5 shows a user interface including information about a particular individual and information about a location visited by the individual.

FIG. 5 shows a user interface 500 including information about a particular individual and information about a location visited by the individual. The user interface 500 may be provided via a display of a client device, such as the client device 306, operated by the individual 308. In some cases, the user interface 500 may be accessible via a client device application executing on the client device 306, such as a mobile device app, while in other cases, the user interface 500 may be accessible via a site of service provider. In certain implementations, the user interface 500 may represent a personal page associated with an individual and that is associated with an account of the individual with a service provider.

The user interface 500 includes a portion 502 that includes information about a particular individual, Individual 102. In the illustrative example of FIG. 5, the portion 502 includes image content of Individual 102 and a current location of Individual 102. The current location of Individual 102 may be determined based on location information provided to a service provider by the client device 306, by another service provider, such as a communication network service provider, or both. The location information may include global positioning system (GPS) data, triangulation data, an Internet Protocol (IP) address, combinations thereof, and the like.

The portion 502 may also include one or more portions 504 that may be selectable to navigate to different pages of a site provided by a service provider. In some cases, the pages accessed upon selection of the portions 504 may depend on a location of Individual 102. For example, selection of the "Local Deals" option may provide one or more pages of a site that include information about deals offered with respect to the current location of Individual 102. Further, the portion 502 may include options 506 and 508 that may be selectable to confirm a location of Individual 102. Selection of one of the options 506 or 508 may cause merchant information to be sent to a service provider that indicates a location for the merchant ABC Restaurant as 12345 Maple Avenue, Dallas, Tex. 75219. The portion 502 may include some information about ABC Restaurant.

In addition, the portion 502 includes a user interface element 510 that enables the entry of data. Particularly, the user interface element 510 is configured to receive text information entered via the computing device 306 by the individual 308 that relates to the current location of the computing device 306. In some cases, the information provided in the user interface element 510 may specify information about the merchant ABC Restaurant. The information may indicate a review of ABC Restaurant, one or more attributes of ABC Restaurant (e.g. hours of operation, location, items offered by ABC Restaurant, etc.), impressions of Individual 102 about ABC Restaurant (e.g. cleanliness of Restaurant ABC, behavior of employees of ABC Restaurant, etc.), combinations thereof, and so on. The portion 502 may include the option 512 that is selectable to submit the information entered in the user interface element 510. In certain situations, at least a portion of the information may be provided to a service provider as merchant information that can be added to a data element of ABC Restaurant stored by the service provider. In some instances, the information included in the user interface element 510 may be provided with certain merchant identifying information indicated in the portion 502, such as the name of the merchant (i.e. ABC Restaurant), a location of the merchant (i.e. 12345 Maple Avenue, Dallas, Tex. 75219), or both.

Example Processes

Figure 6:
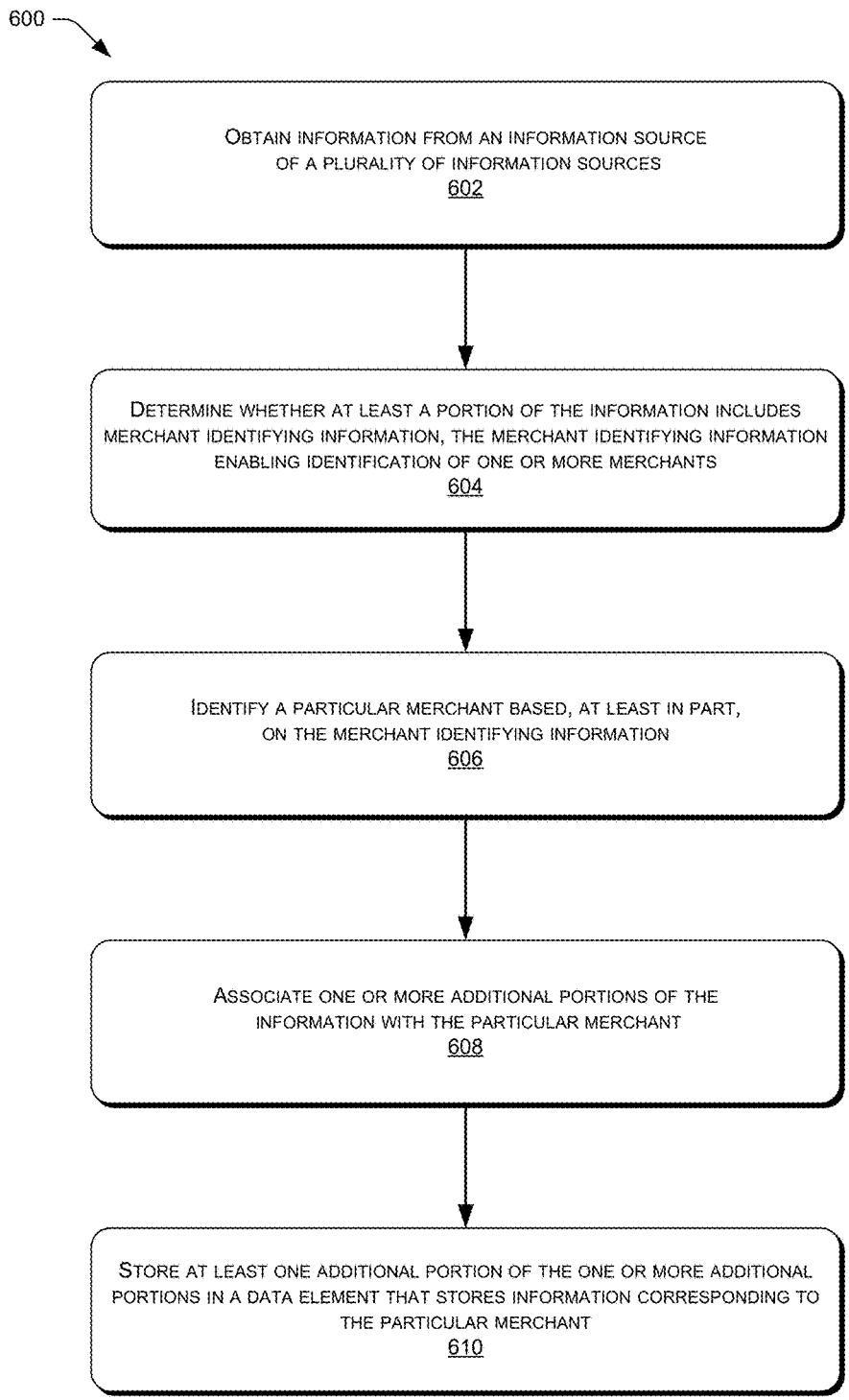
FIG. 6 is a flow diagram of a process to obtain information from a number of sources, identify a merchant associated with the information, and store a portion of the information in a data element of the merchant.
Figure 7:
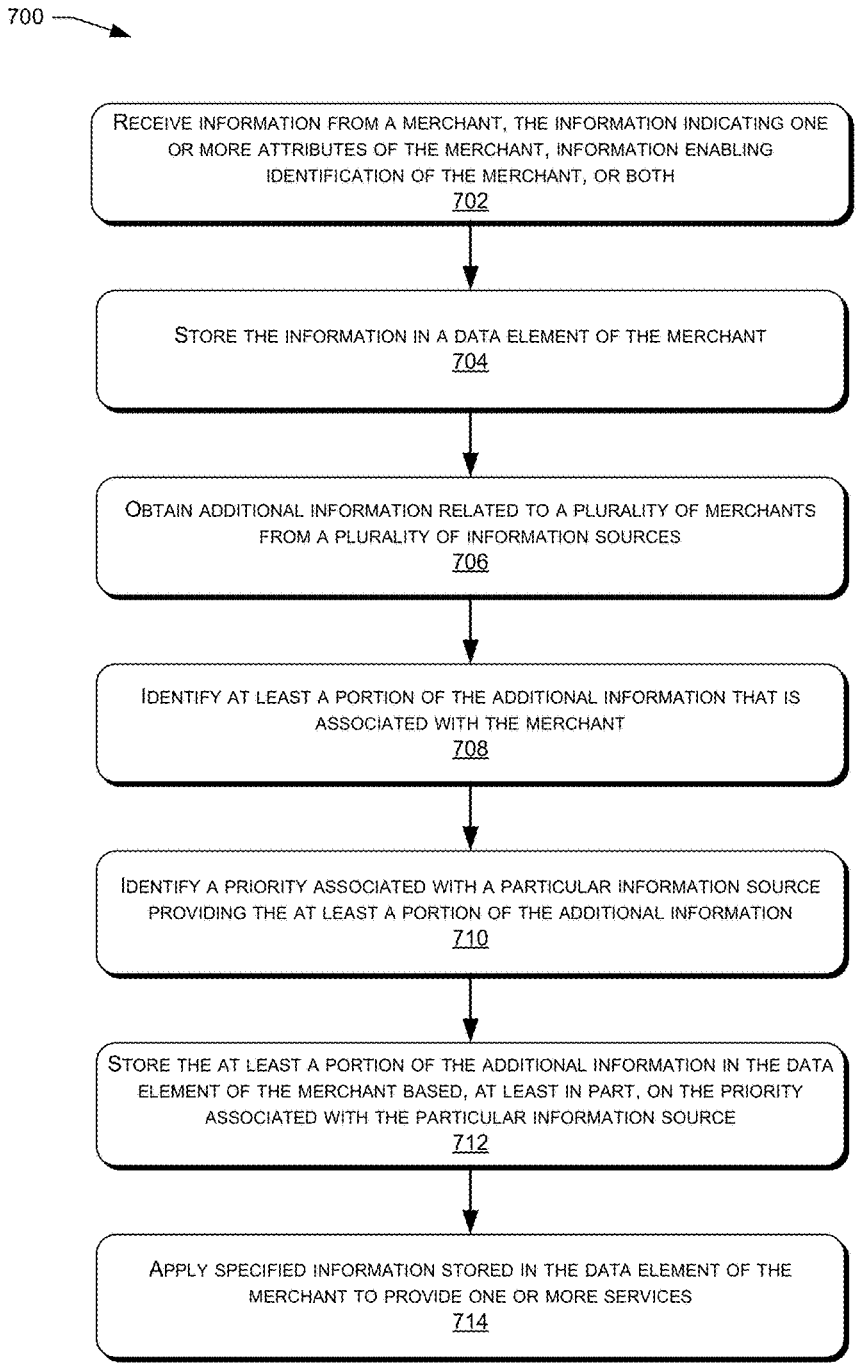
FIG. 7 is a flow diagram of a process to store merchant information received from sources based on a priority associated with the respective sources.
Figure 8:
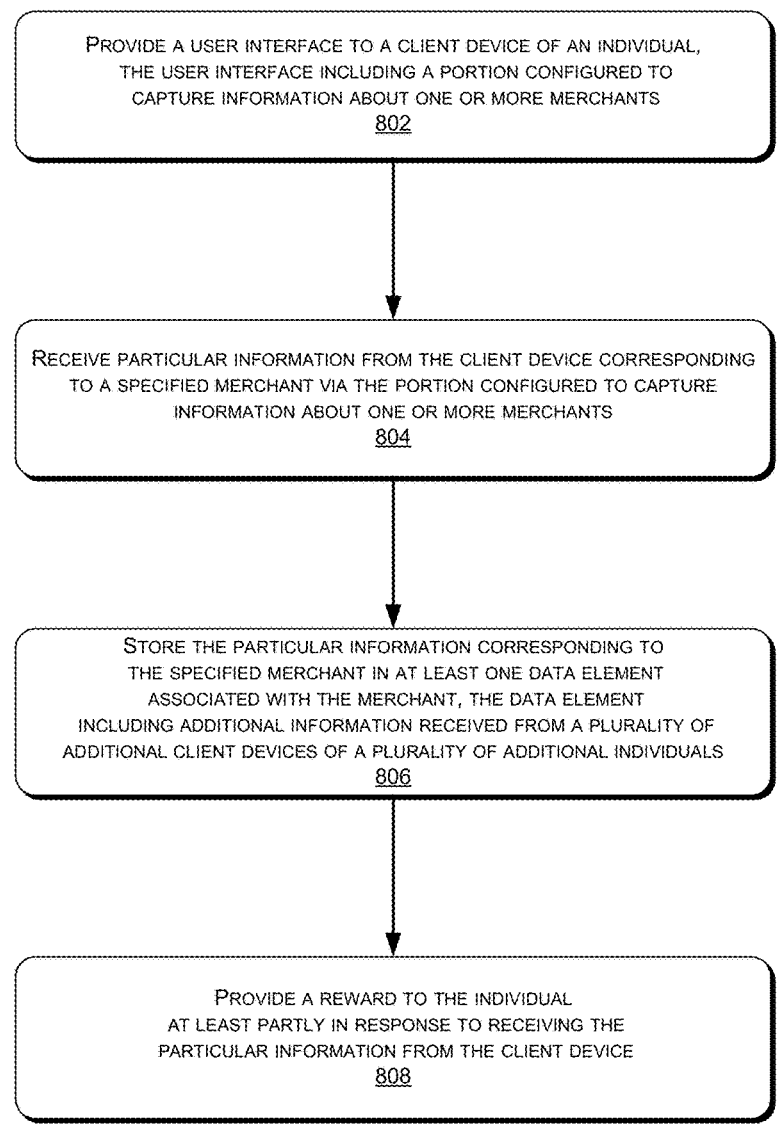
FIG. 8 is a flow diagram of a process to obtain information about merchants via a user interface provided by a service provider and store the information in data elements of respective merchants.

FIGS. 6-8 show processes 600-800 respectively, related to the consumption of the value of deals. The processes 600-800 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data elements, and the like that perform particular functions or implement particular abstract data types. The order in which the operations are described is not intended to be construed as a limitation, and any number of the described blocks can be combined in any order and/or in parallel to implement the process. The operations described in FIGS. 6-8 may be performed by one or more of the components shown in FIGS. 1-5, such as the service provider 102, 202, 302, the merchants 104, 106, 312, client device 306, the service provider server 304, the computing device 310, other computing devices, or a combination thereof.

FIG. 6 is a flow diagram of a process 600 to obtain information from a number of sources, identify a merchant associated with the information, and store a portion of the information in a data element of the merchant. At 602, the process 600 includes obtaining information from an information source of a plurality of information sources and, at 604, the process 600 includes determining whether at least a portion of the information includes merchant identifying information. The merchant identifying information may enable the identification of one or more merchants. In addition, the merchant identifying may include a name of the particular merchant, a tax identification number of the particular merchant, a physical address of the particular merchant, an email address of the particular merchant, a uniform resource locator associated with a site of the particular merchant, a name of an individual associated with the particular merchant, or combinations thereof. Further, the merchant identifying information may include a unique merchant identifier assigned to the particular merchant by a service provider that provides services utilizing specified information associated with merchants. The specified information may be obtained from the plurality of sources and include reviews of merchants, contact information of merchants, location information of merchants, deals offered by merchants, and the like.

At 606, the process 600 includes identifying a particular merchant based, at least in part, on the merchant identifying information and, at 608, the process 600 includes associating one or more additional portions of the information with the particular merchant. The additional portions of the information may include reviews of the particular merchant, ratings of the particular merchant, contact information of the particular merchant, and so forth. In some cases, a service provider may identify additional portions of the information associated with the particular merchant based, at least in part, on one or more tags linking the additional portions with the particular merchant, proximity of the additional portions of the information to the merchant identifying information, context of the additional portions of the information, one or more fields of a user interface configured to capture the additional portions of the information, or combinations thereof.

At 610, the process 600 includes storing at least some additional portions of the information in a data element that stores information corresponding to the particular merchant. In some situations, the service provider may determine whether a data store of the service provider includes a dedicated data element associated with the particular merchant. The service provider may create the data element that stores information corresponding to the particular merchant when the data store does not include a dedicated data element associated with the particular merchant. Additionally, the service provider may check to see if the additional information is already stored in the data element of the merchant. To avoid storing duplicate information, the service provider may refrain from storing the additional information when it is already stored in the data element of the merchant. However, when the additional information is not previously stored in the merchant's data element, the service provider may store the additional information in the data element of the merchant. Further, the service provider may update certain information stored in the data element based on the additional portions of the information. For example, the service provider may replace hours of operation stored in the data element of the merchant with updated hours of operation.

FIG. 7 is a flow diagram of a process 700 to store merchant information received from sources based on a priority associated with the respective sources. At 702, the process 700 includes receiving information from a merchant, where the information indicates one or more attributes of the merchant, information enabling identification of the merchant, or both. The information received from the merchant may include services provided by a service provider to the merchant or other merchants, items offered by the merchant, reviews of the merchant, deals offered via the service provider on behalf of the merchant, ratings of the merchant, or combinations thereof.

At 704, the process 700 includes storing the information in a data element of the merchant. The data element of the merchant may be one of a plurality of data elements associated with the merchant. In addition, the merchant may be associated with a plurality of locations having different physical addresses, and each of the locations of the merchant may be associated with a respective data element. In some cases, when the merchant is associated with multiple data elements, a first data element of the merchant may be associated with a parent entity related to the merchant and a second data element of the merchant may be associated with a subsidiary entity related to the merchant.

At 706, the process 700 includes obtaining additional information related to a plurality of merchants from a plurality of information sources. The plurality of information sources may include the service provider, one or more merchants of a plurality of merchants, one or more additional service providers, one or more individuals that acquired an item from at least one of the plurality of merchants, one or more individuals that visited a location of at least one of the plurality of merchants, or a combination thereof.

At 708, the process 700 includes identifying at least a portion of the additional information that is associated with the merchant and, at 710, the process 700 includes identifying a priority associated with a particular information source providing the at least a portion of the additional information. In some situations, a first priority may be assigned to a first information source and a second priority may be assigned to a second information source. Priorities may be assigned to information sources based on reputations of the information sources, ratings of the information sources, reviews of the information sources, a business relationship between the information sources and the service provider, or combinations thereof. At 712, the process 700 includes storing the at least a portion of the additional information in the data element of the merchant based, at least in part, on the priority associated with the particular information source.

Further, at 714, the process 700 includes applying specified information stored in the data element of the merchant to provide one or more services. The one or more services may include offering deals on behalf of merchants, providing at least a portion of the specified information stored in the data element to one or more additional service providers, providing a directory including particular information associated with merchants, or combinations thereof.

FIG. 8 is a flow diagram of a process 800 to obtain information about merchants via a user interface provided by a service provider and store the information in data elements of respective merchants. At 802, the process 800 includes providing a user interface to a client device of an individual. The user interface may include a portion configured to capture information about one or more merchants. In some cases, a service provider may provide the user interface to the client device when a location of the individual is within a specified distance of a location of the particular merchant, in response to receiving an indication that the individual has acquired an item from the particular merchant, or both. Additionally, the user interface may be provided in association with a site of the service provider, a client device application provided by the service provider, or both. Further, the user interface may indicate an identifier of the merchant. In certain implementations, the user interface may be provided in association with an account of the individual and the user interface may include content personalized for the individual. In some instances, the personalized content may be provided by the service provider and may be based on characteristics of the individual, location of the individual, preferences of the individual, and the like. In other cases, the individual may add content to the user interface. In particular, the service provider may receive an instruction from the client device to include content of the individual in the user interface and render the user interface with the content. The content may include image content of the individual, video content of the individual, audio content of the individual, text content of the individual, or combinations thereof.

At 804, the process 800 includes receiving particular information from the client device corresponding to a specified merchant via the portion of the user interface configured to capture information about one or more merchants. At 806, the process 800 includes storing the particular information corresponding to the specified merchant in at least one data element associated with the merchant. The data element may also include additional information received from a plurality of additional client devices of a plurality of additional individuals.

At 808, the process 800 includes providing a reward to an individual at least partly in response to receiving the particular information from the client device. In some cases, the reward may be non-monetary, while in other cases the reward may be a form of compensation provided to an account of the individual. The account of the individual may be a particular account of the individual with the service provider, a particular account of the individual with a financial institution, a particular account of the individual with the merchant, or a combination thereof. Additionally, the compensation may be associated with one or more promotional currencies, points of a rewards system, one or more monetary currencies, credit to acquire items from merchants, credit to acquire items via the service provider, or combinations thereof.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
receiving, by one or more computing systems of a service provider including a processor and memory, first information from a first information source comprising a merchant;
analyzing, by the one or more computing systems, the first information to identify a portion of the first information related to merchant identification;
determining that the portion of the first information is associated with the merchant;
assigning, by the one or more computing systems, a first priority to the merchant;
determining, by the one or more computing systems, that the portion of the first information is different from second information, wherein the second information is related to merchant identification, the second information is obtained from a second information source, and the second information source has a second priority that is different from the first priority;
replacing, by the one or more computing systems, the second information with the portion of the first information based at least partly on a determination that the first priority is higher than the second priority;
obtaining, by the one or more computing systems, third information related to identifying the merchant from a plurality of third information sources;
analyzing, by the one or more computing systems, the third information to determine that the third information is related to merchant identification;
determining that the third information is associated with the merchant;
assigning, by the one or more computing systems, a third priority to the plurality of third information sources;
determining, by the one or more computing systems, that the service provider received a threshold number of instances of the third information from the plurality of third information sources;
storing, by the one or more computing systems, the third information in a data element of the merchant;
applying, by the one or more computing systems, at least one of the portion of the first information stored in the data element of the merchant or the third information to provide one or more services to the merchant;
determining that fourth information received from a third information source of the plurality of third information sources is a duplicate of the first information;
determining that additional information having a type of data that is not supported by the data element has been received, wherein the type of data includes video content; and
modifying a structure of the data element from a database table to a linked list to support the video content.

2. The computer-implemented method as recited in claim 1, wherein the second priority is assigned to the second information source based, at least in part, on a reputation of the second information source, ratings of the second information source, reviews of the second information source, a business relationship between the second information source and the service provider, or combinations thereof.

3. The computer-implemented method as recited in claim 1, wherein the plurality of third information sources include one or more additional merchants, one or more additional service providers, one or more individuals that acquired at least one item from the service provider, one or more individuals that visited a location of the merchant, or a combination thereof.

4. The computer-implemented method as recited in claim 1, wherein the one or more services include offering deals on behalf of the merchant, providing data stored in the data element to one or more additional service providers, providing a directory of merchants, or combinations thereof.

5. The computer-implemented method as recited in claim 1, wherein the portion of the first information, the second information, the third information, or a combination thereof include at least one item offered by the merchant, reviews of the merchant, at least one deal offered via the service provider on behalf of the merchant, ratings of the merchant, an address of the merchant, or combinations thereof.

6. The computer-implemented method as recited in claim 1, wherein the data element of the merchant is one of a plurality of data elements associated with the merchant.

7. The computer-implemented method as recited in claim 6, wherein the merchant is associated with a plurality of locations having different physical addresses, and each of the plurality of locations of the merchant is associated with a respective data element.

8. The computer-implemented method as recited in claim 6, wherein a first data element of the merchant is associated with a parent entity related to the merchant and a second data element of the merchant is associated with a subsidiary entity related to the merchant.

9. A server comprising:
   a processor; and
   memory accessible by the processor, the memory storing computer-readable instructions that when executed by the processor perform operations comprising:
      obtaining first information from a first information source of a plurality of information sources;
      assigning a first priority to the first information source;
      identifying a merchant of a plurality of merchants based at least partly on the first information;
      determining that the first information is different from second information stored in a data element of the merchant, the second information being obtained from a second information source having a second priority that is different from the first priority;
      replacing the second information with the first information in the data element based at least partly on a determination that the first priority is higher than the second priority;
      obtaining third information from a plurality of third information sources, the plurality of third information sources having a third priority;
      analyzing the third information to determine that the third information is related to identification of the merchant;
      determining that a threshold number of instances of the third information have been received by a service provider;
      storing the third information in the data element of the merchant;
      determining that additional information having a type of data that is not supported by the data element has been received; and
      modifying a structure of the data element to support the type of data.

10. The server as recited in claim 9, wherein the first information includes a name of the merchant, a tax identification number of the merchant, a physical address of the merchant, an email address of the merchant, a uniform resource locator associated with a site of the merchant, a name of an individual associated with the merchant, or combinations thereof.

11. The server as recited in claim 9, wherein the first information includes a unique merchant identifier assigned to the merchant by the service provider that provides services utilizing information obtained from the plurality of information sources.

12. The server as recited in claim 9, wherein the operations further comprise:
   obtaining fourth information from a fourth information source;
   determining that the fourth information is related to identifying an additional merchant; and
   determining that a data store coupled to the server does not include an additional data element associated with the additional merchant.

13. The server as recited in claim 12, wherein the operations further comprise creating the additional data element to store the fourth information.

14. The server as recited in claim 9, wherein identifying the merchant of the plurality of merchants based at least partly on the first information is based, at least in part, on one or more tags linking the first information with the merchant, context of the first information, one or more fields of a user interface used to capture the first information, or combinations thereof.

15. The server as recited in claim 9, wherein the operations further comprise:
   determining that fourth information obtained from a fourth information source is a duplicate of the first information.

16. The server as recited in claim 9, wherein the operations further comprise updating the data element with additional first information obtained from the first information source.

17. The server as recited in claim 9, wherein the operations further comprise:
   sending a communication to the merchant indicating that a service provider is storing the data element and that the data element stores information corresponding to the merchant;
   providing an option to the merchant to claim the data element; and
   receiving an indication from the merchant to claim the data element.

18. A non-transitory computer-readable media storing computer-readable instructions that, when executed, instruct a processor to perform operations comprising:
   obtaining first information from a first information source, the first information source having a first priority;
   analyzing the first information to determine that the first information is related to identification of a merchant;
   obtaining second information from a second information source having a second priority that is different from the first priority;
   determining that the second information is different from the first information and that the second priority is higher than the first priority;
   replacing the first information with the second information;
   providing data corresponding to a user interface to a client device of an individual, the user interface including a portion configured to capture information about one or more merchants;

receiving, from the client device, third information corresponding to the merchant via the portion configured to capture information about the one or more merchants;

determining that the third information is related to identifying the merchant;

assigning a third priority to the individual;

identifying at least one data element associated with the merchant in a data store of a service provider;

determining that a threshold number of instances of the third information have been obtained from a plurality of third information sources having the third priority;

storing the third information in the at least one data element associated with the merchant;

determining that additional information having a type of data that is not supported by the at least one data element has been received; and modifying a structure of the at least one data element to support the type of data.

19. The non-transitory computer-readable media as recited in claim 18, wherein the service provider provides the user interface to the client device based at least partly on a location of the individual being within a distance of a location of the merchant, based at least partly on receiving an indication that the individual has acquired an item from the merchant, or both.

20. The non-transitory computer-readable media as recited in claim 18, wherein the user interface is provided in association with a site of the service provider, a client device application provided by the service provider, or both.

21. The non-transitory computer-readable media as recited in claim 18, wherein the operations further comprise:
receiving an instruction from the client device to include content of the individual in the user interface; and
rendering the user interface with the content.

22. The non-transitory computer-readable media as recited in claim 18, wherein the user interface indicates an identifier of the merchant, the third information includes the identifier of the merchant, or both.

23. The non-transitory computer-readable media as recited in claim 18, wherein:
the operations further comprise:
determining a reward for the individual at least partly based on receiving the third information; and
providing the reward to the individual; and
the reward includes compensation provided to an account of the individual.

24. The non-transitory computer-readable media as recited in claim 23, wherein the account of the individual is an account of the individual with the service provider, an account of the individual with a financial institution, an account of the individual with the merchant, or a combination thereof.

25. The non-transitory computer-readable media as recited in claim 23, wherein the compensation is associated with one or more promotional currencies, points of a rewards system, one or more monetary currencies, credit to acquire items from the merchant, credit to acquire items via the service provider, or combinations thereof.

* * * * *